(12) United States Patent
Ludewig et al.

(10) Patent No.: US 6,803,877 B2
(45) Date of Patent: Oct. 12, 2004

(54) DEVICE FOR GENERATING A TRANSIT TIME DELAY OF A PULSED RADAR SIGNAL AND METHOD FOR OPERATION THEREOF

(75) Inventors: Jürgen Ludewig, Kornwestheim (DE); Wolfgang Mertens, Leimen (DE)

(73) Assignee: Thales Communications GmbH (DE)

( * ) Notice: Subject to any disclaimer, the term of this patent is extended or adjusted under 35 U.S.C. 154(b) by 0 days.

(21) Appl. No.: 10/375,998

(22) Filed: Feb. 27, 2003

(65) Prior Publication Data

US 2003/0164793 A1 Sep. 4, 2003

(30) Foreign Application Priority Data

Mar. 1, 2002 (DE) .......................................... 102 09 291

(51) Int. Cl.⁷ ................................................ G01S 7/40
(52) U.S. Cl. ..................... 342/169; 342/170; 342/172
(58) Field of Search ............................. 342/165, 169, 342/170, 171, 172, 173, 174, 175

(56) References Cited

U.S. PATENT DOCUMENTS

| | | | |
|---|---|---|---|
| 4,164,741 A | 8/1979 | Schmidt | |
| 4,683,473 A | 7/1987 | Haugland | |
| 5,351,054 A | 9/1994 | Fredericks et al. | |
| 5,442,360 A | 8/1995 | Maignan et al. | |
| 5,518,400 A | 5/1996 | Otoide et al. | |

FOREIGN PATENT DOCUMENTS

| | | |
|---|---|---|
| DE | 28 47 348 A1 | 5/1979 |
| FR | 2 733 325 | 2/1984 |
| GB | 2 300 989 A | 11/1996 |

OTHER PUBLICATIONS

"Gigahertz Analog Repeater for Fiber Optic Delay Lines", Ching–Ten Chang;Microwave Theory and Techniques, IEEE Transactions on, vol.: 82, Issue: 4, Apr. 1982 Ps:587–591.*

Company leaflet "TE 12283 Abnahme–Testprotokoll", by Alcatel/SEL dated Feb. 16, 1993.

* cited by examiner

Primary Examiner—John B. Sotomayor
(74) Attorney, Agent, or Firm—Walter A. Hackler (57) ABSTRACT

A device for generating a desired transit time delay of a pulsed radar signal is characterized in that a delay line (13) with signal input and signal output for the pulsed radar signal is provided whose transit causes time delay $\tau$ of the pulsed radar signal, that a signal amplifier (14) is connected downstream of the delay line which increases the amplitude of the pulsed radar signal by a certain amplification factor f, and that a decoupling device (12) is provided which permits supply of at least part of the amplitude of the pulsed radar signal coming from the signal output of the signal amplifier to the signal input of the delay line again and which permits, after n times transit of the pulsed radar signal through the delay line, decoupling of at least part of the amplitude of the pulsed radar signal, wherein T=n·$\tau$ and wherein n is a natural number. This device is suited also for broad-band radar signals and can principally simulate transit distances of the pulsed radar signal which have no upper limit.

16 Claims, 8 Drawing Sheets

DEVICE FOR GENERATING A TRANSIT TIME DELAY OF A PULSED RADAR SIGNAL AND METHOD FOR OPERATION THEREOF

BACKGROUND OF THE INVENTION

The invention concerns a device for generating a desired transit time delay T between a radar signal arriving at the device and an associated pulsed radar signal present at an output of the device, in particular in the microwave range, wherein the transit time delay T corresponds to a certain transit distance S of the pulsed radar signal.

A device of this type is known e.g. from the company leaflet "TE 12283 Abnahme-Testprotokoll" by Alcatel/SEL dated 16 Feb. 1993.

In aviation and seafaring, but also in military defense technology, radar systems are used for detection of moving and stationary objects in the surroundings of the radar system. Radar technology is based on transmitting electromagnetic radiation typically in the microwave range (approximately 10 GHz) and collecting radiation reflected by the object.

In pulsed systems, one can conclude from the transit time of the radiation, i.e. from the time difference between transmission of the pulsed radar signal and detection of the reflected pulsed radar signal, the distance between object and radar system, wherein the radar signal propagates with velocity of light (which depends on the propagation medium). Any frequency shift between transmitted and reflected radiation gives information about the motion (speed) of the object.

To test newly constructed or developed radar systems, use in practice can principally be simulated. Towards this end, the radar system is completely assembled, in particular with radar signal source, transmitting and receiving unit and a radar signal evaluation unit, and operated wherein real objects must be placed at the distances from the transmitting and receiving unit to be investigated. This is very demanding as regards work, time and cost and can in most cases not be realized for larger distances since there should be corresponding visual contact to the target.

For testing, the target can be replaced by a substitute device which receives the pulsed radar signal provided by the radar signal source, stores it and passes it on to the radar signal evaluation unit after a desired time T. The time T thereby simulates the transit time of the radar pulse from the transmitting and receiving unit to the detected object and the associated return path to the transmitting and receiving unit. The time T is therefore designated as transit time delay of the radar signal.

A substitute device of this type thus permits testing of a radar system in a laboratory without having to actually transmit radar signals into the surroundings. In addition to experiments during the development of a new radar system, it is possible to thereby provide an inexpensive proof of the functioning of a radar system which is inexpensive compared to full use in practice. Usually, a purchaser of such a radar system will request such proof from the producer.

In older radar systems, one single radar signal consists of a microwave pulse of uniform frequency during the entire pulse duration (transmitting period). Such radar systems are designated as "narrow-band".

Substitute devices for narrow-band radar systems are already known e.g. from the company leaflet from Alcatel/SEL, see above. They are based on storing the radar signal in a microwave resonator of high quality which, in the cited company leaflet, is a cavity resonator. After lapse of the desired time T, the radar pulse stored in the resonator (or the associated energy) is transferred to the radar signal evaluation unit. To prevent that the radar pulse looses a significant amount of energy during the time T, the resonance curve of the resonator must be very sharp. In that case, the resonator is suited only for storing radar pulses of a very limited frequency interval, i.e. effectively only of radar pulses of one single frequency. Only when the resonator or its resonance frequency is tuned to the radar pulse or its frequency, it is possible to use a substitute device on the basis of a high-quality microwave resonator for narrow-band radar systems.

Modern radar systems use on the one hand spectrally spread (broad-band) pulsed radar signals, i.e. the frequency and/or phase of one individual radar signal is variable during the duration of the pulse. On the other hand, the center frequency of the transmitting pulse can be changed. Such radar systems are also termed "frequency-agile". Frequency-agile radar systems have some decisive advantages over narrow-band radar systems.

For narrow-band radar systems, the smallest resolvable distance unit is proportional to the pulse duration of one single transmitted pulse. To increase the range, for modern radar systems, the transmitted signal is expanded at the frequency level and also at the time level to bridge a maximum distance with low peak pulse power. In radar signal processing, the received pulse is again compressed, thereby realizing the desired distance resolution. As a result, frequency-agile radar systems require much less peak pulse power, i.e. smaller amplitude of the transmitted radar signal than narrow-band radar systems with identical distance resolution and identical range.

One further advantage of the frequency-agile radar systems is the reduced interference liability compared with narrow-band radar systems. Narrow-band radar systems can be blinded effectively through overload of the receiving unit by a jammer which transmits at one single transmitting frequency only. Frequency-agile radar systems, however, transmit and receive at a large frequency spectrum such that effective disturbance is much more difficult and requires in particular much more power and a broader transmission spectrum of the jammer.

In a modern frequency-agile radar system which utilizes the pulse compression method, the use of a substitute device on the basis of a resonator, is not possible since it cannot store a broad-band radar signal.

SUMMARY OF THE INVENTION

In contrast thereto, it is the underlying purpose of the present invention to present a device for generating a desired transit time delay T between a pulsed radar signal arriving at the device and an associated pulsed radar signal present at an output of the device, in particular in the microwave range, wherein the transit time delay T corresponds to a certain transit distance S of the pulsed radar signal, with the device also being suited for broad-band radar signals, and wherein in principle transit paths S of the pulsed radar signal which have no upper limit can be simulated.

In accordance with the invention, this object is achieved in a surprisingly simple and effective fashion, in that a delay line comprising a signal input and a signal output for the pulsed radar signal is provided, whose transit causes a time delay $\tau$ of the pulsed radar signal between its input at the signal input of the delay line and its output at the signal output of the delay line, a signal amplifier with a signal input and a signal output for the pulsed radar signal is connected downstream of the signal output of the delay line, wherein the signal amplifier increases the amplitude of the pulsed radar signal arriving at the signal input of the signal amplifier by a certain amplification factor f, and a decoupling device is provided which permits supply of at least part of the amplitude of the pulsed radar signal coming from the signal output of the signal amplifier into the signal input of the delay line again, and which permits, after n-fold transit of the pulsed radar signal through the delay line and the signal amplifier, decoupling of at least part of the amplitude of the pulsed radar signal to the output of the device, wherein $T=n\cdot\tau$ and wherein n is a natural number.

In contrast to the substitute device on the basis of the resonator, in the inventive device, the pulsed radar signal is delayed mainly through propagation of a pulse in a delay line. Propagation of the pulse does not depend on its frequency spectrum. The pulse in the delay line contains all information of the pulsed radar signal, but does not need to be a radar signal itself.

The inventive design of the device permits use of the delay line several times in sequence after the required amplification of the pulsed radar signal such that longer transit distances S, in particular tactic distances in the order of 100 km can also be simulated by the inventive device. If the delay line shall be used several times, the device and the pulsed radar signal must be tuned to each other such that the pulsed radar signal does not overlap itself within the device, i.e. that the "front" of the pulsed radar signal does not reach the signal input of the delay line for a second time before the "end" of the pulse has passed this signal input for the first time. The multiple use of the delay line is never critical when the duration of the pulsed radar signal D is shorter than the time delay $\tau$ of the delay line. Corresponding setting of D and $\tau$ with $D<\tau$ is in practice generally easy to realize and presents only a minor limitation of the applicability of the inventive device.

In a particularly preferred embodiment of the inventive device, n is larger or equal to 2. In this case, the advantages of the device are particularly obvious. Large transit time delays T can be generally produced through selecting a corresponding length for the delay line. However, the pulse carrying the information of the pulsed radar signal is weakened within the delay line. Amplification should be effected as long as the pulse can clearly be distinguished from noise which effectively limits the maximum possible length of a delay line. Multiple use of the same delay line also saves space and material thereby keeping the production or acquisition costs of the device low. When the delay line is used several times, it is easy to produce different transit time delays T with only one device. The transit time delay T can be set in steps of $\tau$ through selection of the number of passages.

In a further preferred embodiment, the decoupling device comprises a switching means which supplies the pulsed radar signal coming from the signal output of the signal amplifier either to the signal input of the delay line or to the output of the device. This embodiment is particularly easy to realize and serves for simulation of a singular object at a distance S/2 from the radar system. The entire amplitude of the pulsed radar signal is available for possible refeeding of the pulsed radar signal into the delay line such that the obtained signal-to-noise-ratio (S/N) is particularly good.

A method for operating this embodiment is also within the scope of the present invention which is characterized in that at the time when the pulsed radar signal arrives at the device, the switching means is in a switching position such that the pulsed radar signal is supplied to the signal input of the delay line, and after the desired transit time delay T, the pulsed radar signal is switched to the output of the device.

In an alternative embodiment of the inventive device, the decoupling device comprises a directional coupler which guides part of the amplitude of the pulsed radar signal coming from the signal output of the signal amplifier to the signal input of the delay line and decouples another part, in particular the remaining part, of the amplitude of the pulsed radar signal. In this fashion, the device produces a pulse in each cycle of the pulsed radar signal.

In a further development of this embodiment, the directional coupler is provided with a time switch which supplies after a predetermined time t, the decoupled other part of the amplitude of the pulsed radar signal to the output of the device. In this fashion, the device can be used for simulating a singular object.

The invention includes also a method for operating this further development of the inventive device which is characterized in that before supplying a new pulsed radar signal arriving at the device, the amplification factor f of the signal amplifier is reduced that much that the amplitude of a pulsed radar signal which possibly runs through the delay line and the signal amplifier, is reduced to noise level before the new pulsed radar signal arriving at the device enters. In this fashion, undesired overlapping of different pulsed radar signals is prevented which would impair the function of the device.

In an alternative further development, the directional coupler supplies the decoupled other part of the amplitude of the pulsed radar signal directly to the output of the device. This produces a delay pulse series which corresponds to a series of equidistant objects. Thus, n targets in n equidistant distance cells are produced.

In another preferred embodiment of the inventive device, the delay line comprises a microwave line. A microwave line can take up the pulsed radar signal directly and immediately. It is suited in particular for short time delays $\tau$. It is also feasible to design a partial section of the delay line as a microwave line in order to finely tune the time delay $\tau$ of the entire delay line.

One embodiment is particularly preferred which is characterized in that the delay line comprises an optical conductor, preferably a glass fiber conductor, and that at the start and at the end of the optical conductor, one signal transformer is provided each, which transforms the incoming pulsed radar signal into an optical signal or the optical signal into an outgoing radar signal, respectively. The pulsed radar signal is modulated onto an optical wave, typically a laser beam. This modulated laser beam passes through the optical conductor and is subsequently demodulated whereupon the pulsed radar signal is again available. Glass fiber conductors are easy to get and relatively inexpensive. Moreover, they have a relatively low absorption coefficient such that also after relative large lengths of the delay line, e.g. approximately 10 km, the S/N ratios are still sufficient.

In another embodiment, the delay line comprises an acoustic conductor, and at the start and at the end of the acoustic conductor one signal transformer is provided each, which transforms the incoming pulsed radar signal into an acoustic signal or the acoustic signal into an outgoing radar signal, respectively. The acoustic conductor may be made of numerous solid materials which are widely available and easy to handle.

Also within the scope of the present invention is a facility for generating a desired transit time delay $T_S$ between a pulsed radar signal arriving at the facility and an associated pulsed radar signal present at an exit of the facility, in particular in the microwave range, wherein the transit time delay $T_S$ corresponds to a certain transit distance $S_S$ of the pulsed radar signal, characterized in that m devices of the above-described inventive type are connected in series, wherein $$T_S = \sum_{i=1}^{m} T_i$$

and wherein $T_i$ corresponds to the transit time delay T of the ith device and m is a natural number. The facility advantageously permits production of a quasi-continuous distance spectrum of the objects to be simulated.

The invention also comprises a facility for generating a desired transit time delay $T_P$ between a pulsed radar signal arriving at the facility and an associated pulsed radar signal present at an output of the facility, in particular in the microwave range, wherein the transit time delay $T_P$ corresponds to a certain transit distance $S_P$ of the pulsed radar signal, characterized in that the facility comprises several devices of the above-described inventive type, and that a selector means is provided which supplies the pulsed radar signal arriving at the facility to one of the devices determined by the selector means, and that the output of the device determined by the selector means is switched to the output of the facility, wherein $T_P$ corresponds to the transit time delay T of the device determined by the selector means. This permits quick selection from several different transit time delays.

The present invention also includes a method for operating an inventive device as explained above, wherein the amplification factor f of the signal amplifier is adjusted such that the amplitude of the pulsed radar signal present at the output of the device is approximately equal to the amplitude of the associated pulsed radar signal which entered the device directly before. This method ensures that the signal amplifier of the device does not overcompensate the attenuation of the pulsed radar signal (i.e. the device starts to oscillate).

A further inventive method for operating the above-mentioned inventive device is characterized in that the amplification factor f of the signal amplifier is adjusted such that the amplitude of the pulsed radar signal leaving the signal output of the signal amplifier is smaller or equal to the amplitude of the pulsed radar signal which arrived directly before at the signal input of the delay line. This also ensures that the signal amplifier of the device does not overcompensate the attenuation of the pulsed radar signal (i.e. the device starts to oscillate). In this fashion, the components of the inventive device and the receiving means of the radar system are protected from overload.

Finally, the invention includes a method for operating an inventive device as explained above, wherein the pulsed radar signal arriving at the device is broad-band and/or coded. In this case, the advantages of the invention, in particular the possibility to subject non-monofrequency radar signals to a transit time delay T are fully utilized.

Further advantages of the invention can be extracted from the description and the drawing. The features mentioned above and below can be used in accordance with the invention either individually or collectively in any arbitrary combination. The embodiments shown and described are not to be understood as exhaustive enumeration but rather have exemplary character for describing the invention.

The invention is shown in the drawing and is explained in more detail by means of embodiments.

DESCRIPTION OF PREFERRED EMBODIMENTS

Figure 1:
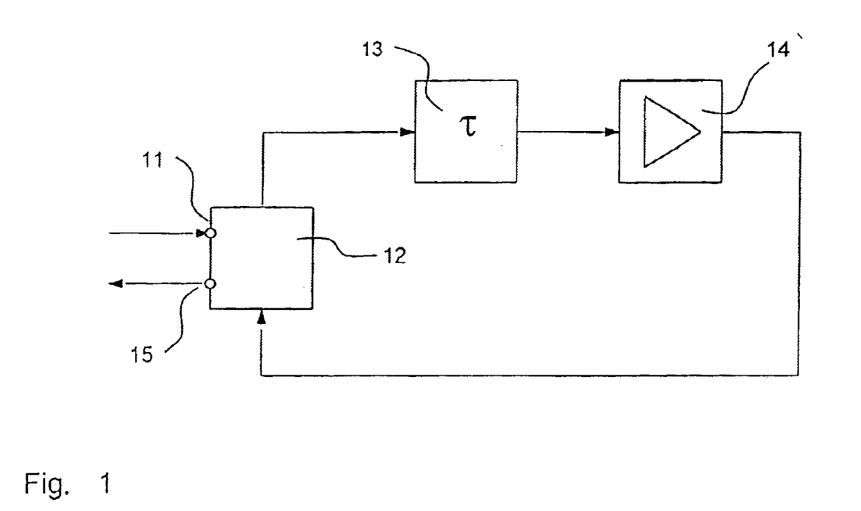
FIG. 1 shows the schematic design of an inventive device for producing a transit time delay of a pulsed radar signal.

FIG. 1 shows schematically the design of an inventive device for producing a transit time delay T of a pulsed radar signal. A pulsed radar signal arriving at the input 11 of the device which belongs to the decoupling device 12 of the device, represented by an arrow (coming from the left) is passed on to the signal input of the delay line 13. Between arrival of the pulsed radar signal at the signal input of the delay line 13 and outcome of the pulsed radar signal at the signal output of the delay line 13, a time delay of τ takes place. The considerably weakened pulsed radar signal is passed on to the input of the signal amplifier 14 where its amplitude is increased by the amplification factor f, i.e. f>1. The pulsed radar signal which is amplified in this fashion, is now guided to the decoupling device 12. If the desired transit time delay T of the pulsed radar signal has not been achieved yet, the amplitude of the pulsed radar signal is at least partially supplied again to the signal input of the delay line 13 and passed on and processed as described above until it is again supplied to the decoupling device 12. As soon as the desired transit time T has been achieved, which is the case approximately after n=T/τ cycles, wherein n can be selected only as natural number and therefore T only as multiple of τ, at least part of the amplitude of the pulsed radar signal is decoupled to the output 15 of the device. The approximation mentioned consists in neglecting transit times of the pulsed radar signal within the device but outside of the delay line.

Figure 2A:
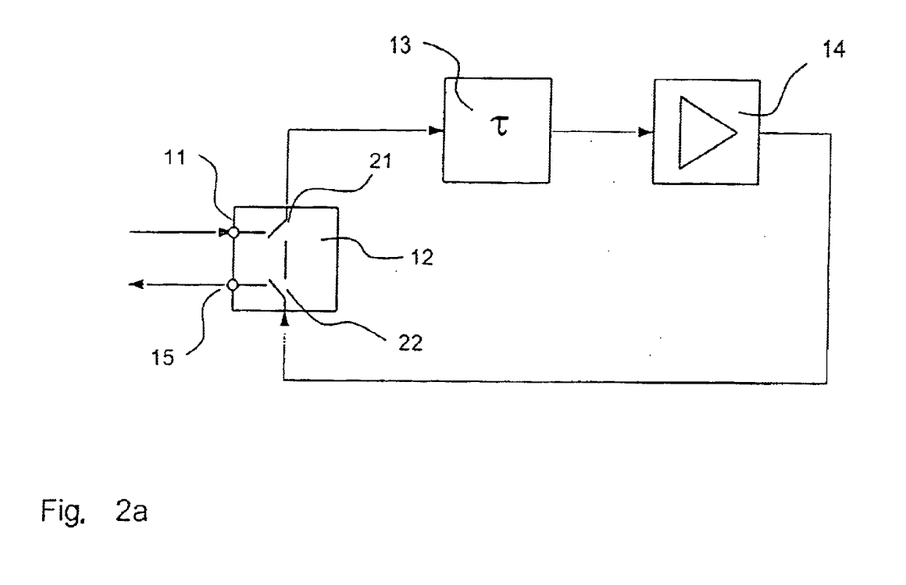
FIG. 2a shows the inventive device of FIG. 1 with two switching means in the decoupling device.

FIG. 2a explains in more detail a possible design of the decoupling device 12. For passing on a pulsed radar signal from the input 11 of the device to the signal input of the delay line 13, an upper switching means 21 of the decoupling device 12 is in the left position. The pulsed radar signal which arrives at the decoupling device after a circulation through the device, is passed on through a lower switching device 22 either in the right switching position for a further circulation to the upper switching means 21, which in turn must be switched in the right-hand position for passing on the pulsed radar signal to the signal input of the delay line 13, or the lower switching device 22 passes on the pulsed radar signal arriving at the decoupling device 12 in the left switching position to the output 15 of the device. In both cases, the full amplitude of the pulsed radar signal is passed on to a target location. To set a certain time delay T, the lower switching device 22 must be switched from the right into the left position after the "end" of the pulsed radar signal in its (n−1)th cycle has left but before the arrival of the "front" of the pulsed radar signal at the lower switching device 22 in its last nth cycle.

Figure 2B:
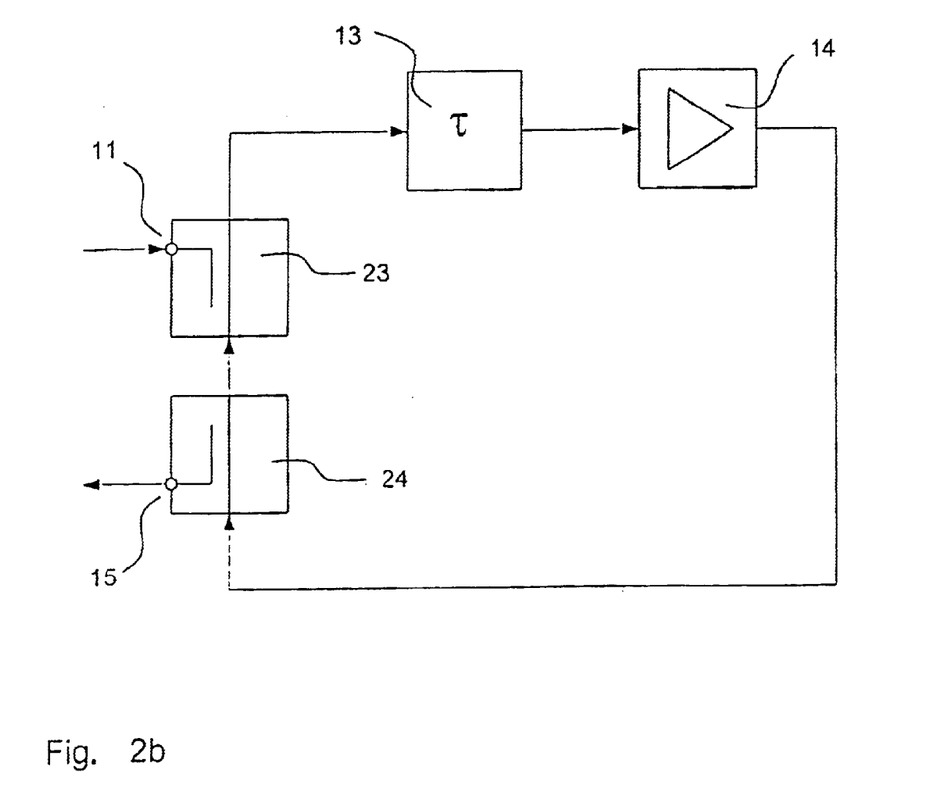
FIG. 2b shows the inventive device of FIG. 1 with a directional coupler in the decoupling device.

FIG. 2b shows an alternative design of the decoupling device 12. It is formed in two parts with a coupling device 23 and a directional coupler 24. A pulsed radar signal coming in at the directional coupler 24 is always passed on with part of its amplitude for further passage to the coupling device 23 and therefore indirectly to the signal input of the delay line 13, and is decoupled with another part of its amplitude to the output 15 of the device. During each circulation of the pulsed radar signal, a pulsed radar signal is produced at the output 15 of the device. A series of objects can be simulated on a radar screen in this fashion wherein the objects are at a uniformly increasing separation from the radar system wherein the separation between two neighboring objects corresponds to the transit path of the radar radiation which it travels within one cycle, i.e. approximately within the time $\tau$.

Figure 2C:
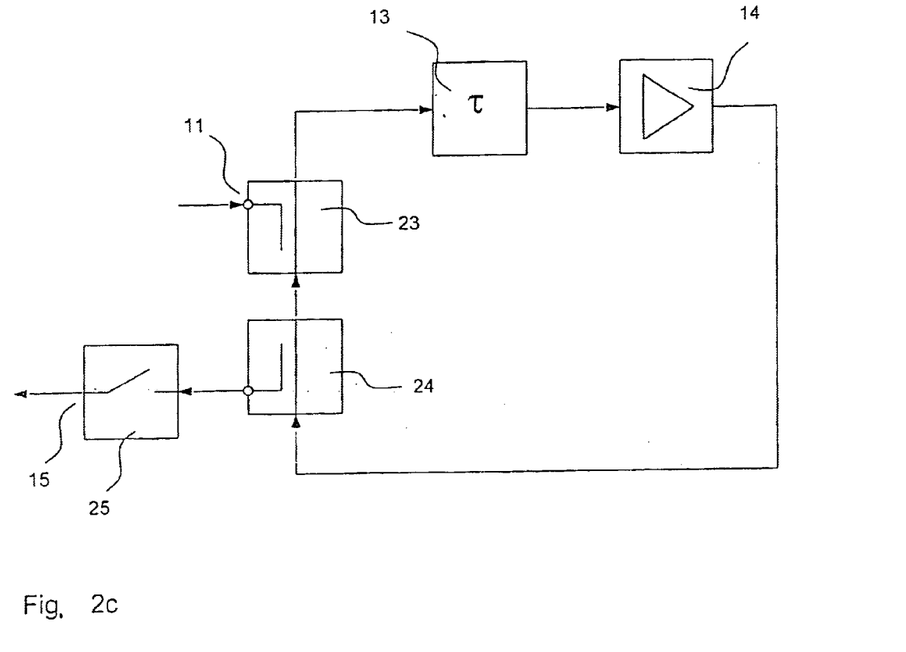
FIG. 2c shows the inventive device of FIG. 1 with a directional coupler in the decoupling device and with a time switch.

FIG. 2c shows a further development of the embodiment of the decoupling device 12 shown in FIG. 2b. The amplitude part of the pulsed radar signal decoupled by the directional coupler 24 is guided to a time switch 25. When the first or further decoupled radar signals are not to be passed on to the output 15 of the device, they are excluded from the output 15 of the device through the open time switch 25. Only after expiration of a certain time, namely the desired transit time delay T, the time switch 25 is closed and decoupled signals can reach the output 15 of the device. To remove a running pulsed radar signal from the device, the amplification factor f of the signal amplifier 14 is reduced that much that the amplitude of the pulsed radar signal finally corresponds to the noise amplitude in the device through dissipation.

Figure 3:
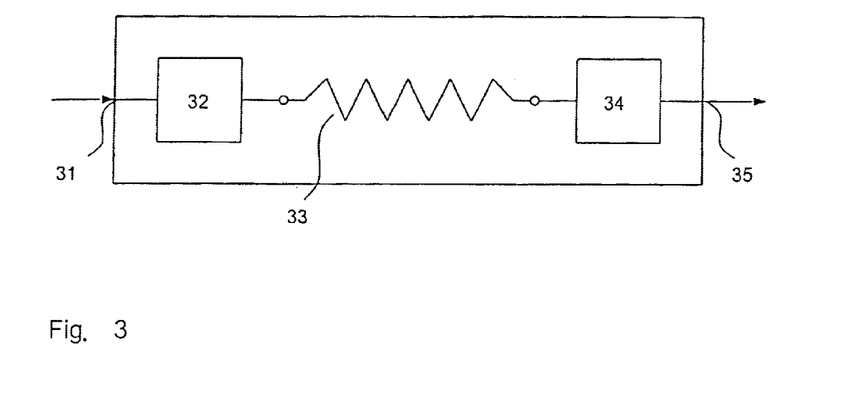
FIG. 3 shows the schematic design of the delay line associated with the inventive device of FIG. 1 which is designed as an optical conductor.

FIG. 3 schematically shows an embodiment of the delay line 13 of the inventive device of FIG. 1. The pulsed radar signal which is present at a signal input 31 of the delay line 13 is at first passed on to the modulator 32. This signal transformer modulates the information of the pulsed radar signal onto an optical wave. This optical wave is a monochromatic laser beam which is also produced in the modulator 32. The modulated optical wave is guided to an optical conductor which is formed as a glass fiber conductor 33. The glass fiber conductor 33 has a length l and a refractive index b. Passsage of the optical wave through the glass fiber conductor 33 requires the time $\tau$. The length of the optical conductor l multiplied with its refractive index b corresponds approximately to the simulated transit distance s per cycle of the pulsed radar signal at the earth surface where the refractive index can be assumed to be 1. $\tau=(bl)/c=s/c$ wherein c is the vacuum light velocity. The length of the optical conductor l is thereby selected to be the transit path S to be simulated or preferably an integer divisor of S. Moreover, l is that large that $\tau$ is larger or equal to the duration of the pulsed radar signal D to avoid overlapping of the pulsed radar signal with itself. Particularly preferred are lengths of the optical conductor l between 1 and 10 km. After passage of the glass fiber conductor 33, the optical wave is transformed in the second signal transformer, the demodulator 34, into a microwave signal and the pulsed radar signal is created again and passed on to the signal output 35 of the delay line 13.

Figure 4A:
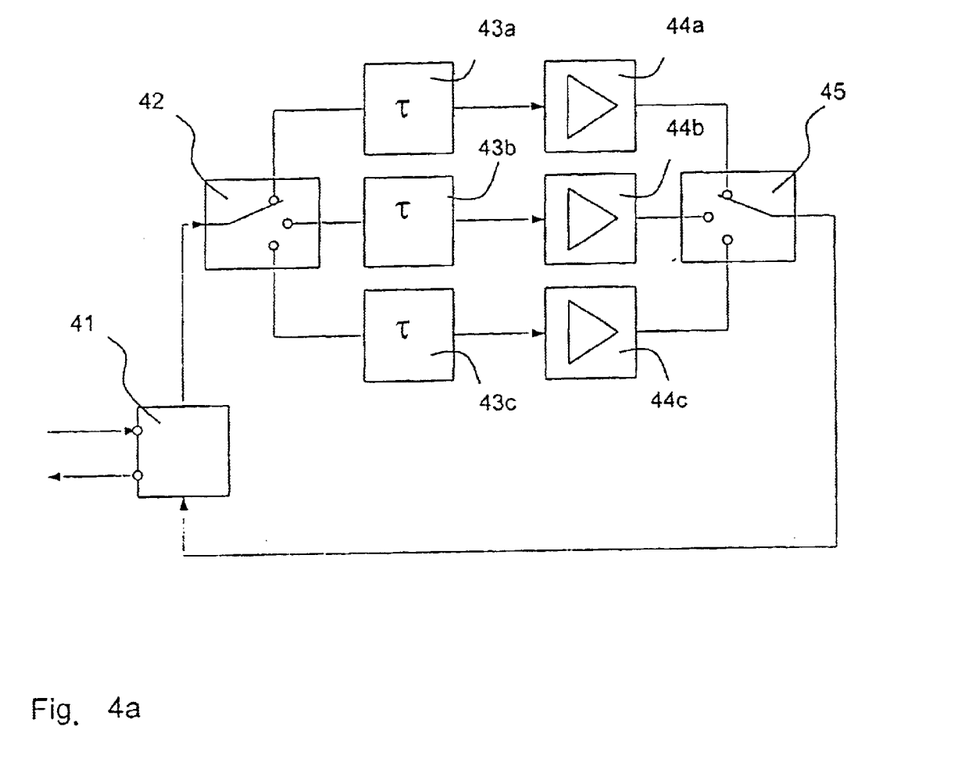
FIG. 4a shows the schematic design of an inventive facility wherein three inventive devices of FIG. 1 are connected in parallel.

FIG. 4a shows an inventive facility in which three inventive devices analog to FIG. 1 are connected in parallel. A pulsed radar signal arriving at a coupling and decoupling device 41 of the facility is guided to an input distributor 42 of a two-part selector means and passed on corresponding to the switch position to one of three branches a, b or c of delay lines 43 and signal amplifiers 44. The delay lines 43 of the various branches a, b, c have different time delays $\tau$. At the collector 45 which represents the second part of the selector means and whose switch has the same position as that of the input distributor 42, the pulsed radar signal is passed on to the coupling and decoupling device 41 of the facility. The signal line from the collector 45 to the coupling and decoupling device 41 of the facility is commonly used by all three branches a, b and c. The selector means permits rapid change between different time delays $\tau$ per cycle without having to exchange the delay line 13 of the device of FIG. 1. By suitable design of the selector means which permits change of the branch while a signal is in one of the delay lines, it is achieved that the individual branches a, b and c are functionally wired in series. In this design, the switch of the collector 45 must be adjustable to the position of the previous branch, whereas the switch of the input distributor 42 simultaneously must be adjustable to the position of the branch to be newly selected.

Figure 4B:
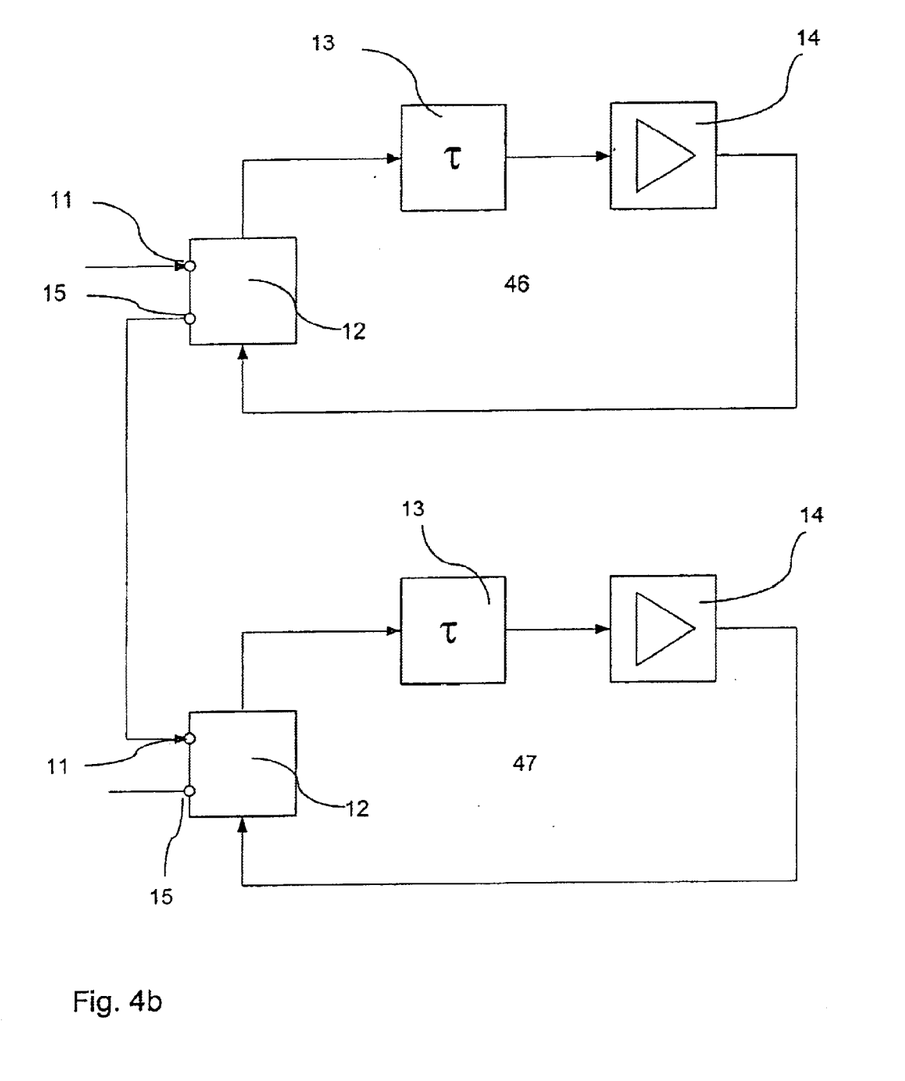
FIG. 4b shows the schematic design of an inventive facility wherein two inventive devices of FIG. 1 are connected in series.

FIG. 4b schematically shows an inventive facility which contains two inventive devices in accordance with FIG. 1 wherein they are connected in series. A pulsed radar signal is initially supplied to the input of the upper device 46 which is at the same time the input of the facility. After expiration of time $T_1$, the pulsed radar signal reaches the output of the upper device 46 and is supplied to the input of the lower device 47. After expiration of time $T_2$, the pulsed radar signal is present at the output of the lower device 47, which is simultaneously the output of the facility. The entire transit time delay $T_S$ results from $T_S=T_1+T_2$. This permits setting of transit time delays which would not be accessible with one single device. In a corresponding design of a facility with serially connected inventive devices according to FIG. 1, a quasi-continuous spectrum of adjustable transit time delays can be obtained.

Figure 5:
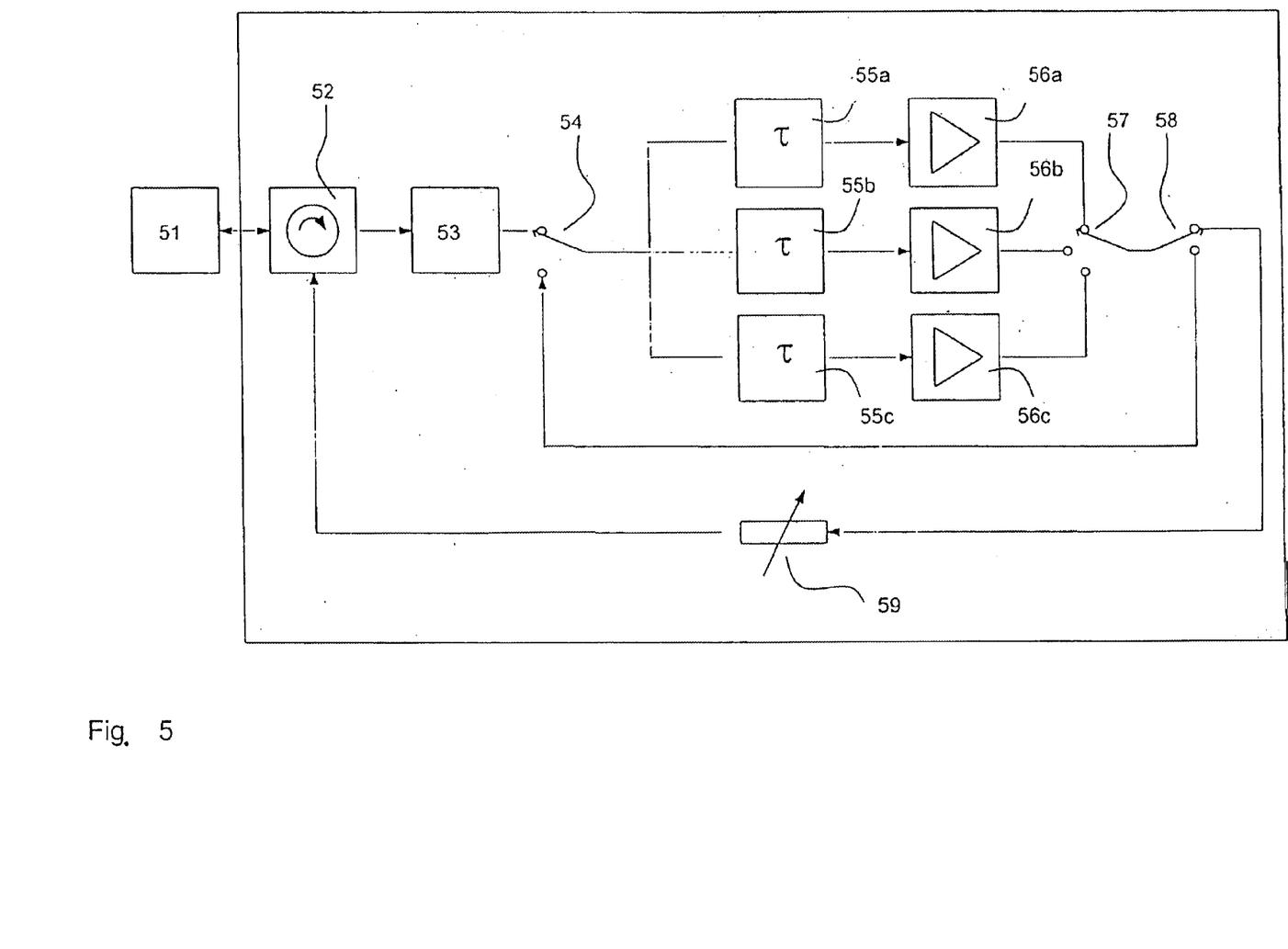
FIG. 5 shows the schematic construction of an inventive facility ("echo box") tested in practice for generating a transit time difference of a pulsed radar signal.

FIG. 5 shows the schematic embodiment of an echo box which the applicant has constructed on the basis of the present invention and applied successfully in practice to solve the inventive problem.

A radar system, BORA 550 or its components radar signal source and radar signal evaluation means, reference numeral 51, is tested by means of the echo box. Towards this end, the pulsed radar signal leaving the radar system 51 is guided to the echo box on a circulator 52. The circulator 52 guides a signal present at one of its terminals, to the terminal which follows next in the direction of the arrow (clockwise). In this case, the circulator 52 passes the pulsed radar signal on to a phase shifter 53 which shifts the center frequency of the radar signal such that it serves to simulate the Doppler shift of a moved object and passes the pulsed radar signal on to the switch 54. At this point in time, the switch 54 is in the upper position such that the pulsed radar signal is guided further to the three parallel branches a, b, and c of the delay lines 55 and signal amplifiers 56. The switch 57 selects a branch, the upper branch a in the example shown, and its signal is passed on to the switch 58. This switch 58 either decouples the pulsed radar signal (shown upper switch position) or guides it to the switch 54 (lower position of the switch 58). In the latter case, the switch 54 which is now in its lower position guides the pulsed radar signal again to the three parallel branches a, b, and c of delay lines 55 and signal amplifiers 56. If the pulsed radar signal is decoupled at the switch 58, it reaches the controllable damping member 59 which serves for defined damping (attenuation) of the pulsed radar signal. The defined damping permits e.g. measurement of the sensitivity of the tested radar system 51. The connection between switch 58 and circulator 52 is therefore also designated as variable calibration line. The pulsed radar signal coming from the controllable damping member 59 is passed on to the circulator 52 which returns it finally to the radar system 51. At this point in time, the pulsed radar signal is then present provided with a transit time delay $T_{ges}$ and a Doppler shift as well as with defined damping.

We claim:

1. Device for generating a desired transit time delay T between a pulsed radar signal arriving at the device and an associated pulsed radar signal present at an output of the device, in particular in the microwave range, wherein the transit time delay T corresponds to a certain transit distance S of the pulsed radar signal, characterized in that
   a) a delay line comprising a signal input and a signal output for the pulsed radar signal is provided, whose transit causes a time delay τ of the pulsed radar signal between its input at the signal input of the delay line and its output at the signal output of the delay line,
   b) a signal amplifier with a signal input and a signal output for the pulsed radar signal is connected downstream of the signal output of the delay line, wherein the signal amplifier increases the amplitude of the pulsed radar signal arriving at the signal input of the signal amplifier by a certain amplification factor f, and
   c) a decoupling device is provided which permits supply of at least part of the amplitude of the pulsed radar signal coming from the signal output of the signal amplifier into the signal input of the delay line again, and which permits after n-fold transit of the pulsed radar signal through the delay line and the signal amplifier, decoupling of at least part of the amplitude of the pulsed radar signal to the output of the device, wherein T=n·τ and wherein n is a natural number.

2. Device according to claim 1, characterized in that n is larger or equal to 2.

3. Device according to claim 1, characterized in that the decoupling device comprises a switching means which supplies the pulsed radar signal coming from the signal output of the signal amplifier either to the signal input of the delay line or to the output of the device.

4. Device according to claim 1, characterized in that the decoupling device comprises a directional coupler which guides part of the amplitude of the pulsed radar signal coming from the signal output of the signal amplifier to the signal input of the delay line and decouples another part, in particular the remaining part of the amplitude of the pulsed radar signal.

5. Device according to claim 4, characterized in that the directional coupler is provided with a time switch which supplies after a predetermined time t, the decoupled other part of the amplitude of the pulsed radar signal to the output of the device.

6. Device according to claim 4, characterized in that the directional coupler supplies the decoupled other part of the amplitude of the pulsed radar signal directly to the output of the device.

7. Device according to claim 1, characterized in that the delay line comprises a microwave line.

8. Device according to claim 1, characterized in that the delay line comprises an optical conductor, preferably a glass fiber conductor and that at the start and at the end of the optical conductor one signal transformer is provided each, which transforms the incoming pulsed radar signal into an optical signal or the optical signal into an outgoing radar signal, respectively.

9. Device according to claim 1, characterized in that the delay line comprises an acoustic conductor, and that at the start and at the end of the acoustic conductor one signal transformer is provided each, which transforms the incoming pulsed radar signal into an acoustical signal or the acoustical signal into an outgoing radar signal, respectively.

10. Apparatus for generating a desired transit time delay $T_s$ between a pulsed radar signal arriving at the facility and an associated pulsed radar signal present at an output of the facility, in particular in the microwave range, wherein the transit time delay $T_s$ corresponds to a certain transit distance $S_s$ of the pulsed radar signal, characterized in that m devices in accordance with claim 1 are connected in series, wherein $$T_s = \sum_{i=1}^{m} T_i$$

and wherein $T_i$ is the transit time delay T of the ith device and m is a natural number.

11. Apparatus for generating a desired transit time delay $T_p$ between a pulsed radar signal arriving at the facility and an associated pulsed radar signal present at an output of the facility, in particular in the microwave range, wherein the transit time delay $T_p$ corresponds to a certain transit distance $S_p$ of the pulsed radar signal, characterized in that the facility comprises several devices according to claim 1, and that a selector means is provided which supplies the pulsed radar signal arriving at the facility to one of the devices determined by the selector means, and that the output of the device determined by the selector means is switched to the output of the facility, wherein $T_p$ corresponds to the transit time delay T of the device determined by the selector means.

12. Method for operating a device according to claim 3, comprising causing the switching means to be in a switching position such that the pulsed radar signal is supplied to the signal input of the delay line when the pulsed radar signal arrives at the device, and after the desired transit time delay T the pulsed radar signal is switched to the output of the device.

13. Method for operating a device according to claim 5, comprising reducing the amplification factor f of the signal amplifier is as much as the amplitude of a pulsed radar signal which possibly runs through the delay line before supplying a new pulsed radar signal to the device and the signal amplifier is reduced to noise level before the new pulsed radar signal arrives at the device.

14. Method for operating a device according to claim 1, comprising adjusting the amplification factor f of the signal amplifier such that the amplitude of the pulsed radar signal present at the output of the device is approximately equal to the amplitude of the associated pulsed radar signal which entered the device directly before.

15. Method for operating a device according to claim 1, comprising adjusting the amplification factor f of the signal amplifier such that the amplitude of the pulsed radar signal leaving the signal output of the signal amplifier is smaller or equal to the amplitude of the pulsed radar signal which arrived directly before at the signal input of the delay line.

16. Method for operating a device according to claim 1, comprising providing a broad-band and/or coded the pulsed radar signal to the device.

* * * * *